US012560358B2

(12) United States Patent (10) Patent No.: US 12,560,358 B2
Jiang (45) Date of Patent: Feb. 24, 2026

(54) PROFILE PRESSING COMPONENT

(71) Applicant: Trina Solar Co., Ltd, Changzhou (CN)

(72) Inventor: Ahua Jiang, Changzhou (CN)

(73) Assignee: Trina Solar Co., Ltd, Changzhou (CN)

( * ) Notice: Subject to any disclaimer, the term of this patent is extended or adjusted under 35 U.S.C. 154(b) by 0 days.

(21) Appl. No.: 18/398,772

(22) Filed: Dec. 28, 2023

(65) Prior Publication Data

US 2024/0162853 A1 May 16, 2024

Related U.S. Application Data

(63) Continuation of application No. PCT/CN2023/092662, filed on May 8, 2023.

(30) Foreign Application Priority Data

Nov. 9, 2022 (CN) .......................... 202211398992.9

(51) Int. Cl.
*F24S 25/632* (2018.01)
*F16B 5/12* (2006.01)
(Continued)

(52) U.S. Cl.
CPC ............ *F24S 25/632* (2018.05); *F16B 5/126* (2013.01); *H02S 30/10* (2014.12); *F24S 2025/6002* (2018.05)

(58) Field of Classification Search
CPC ......... Y10T 403/7043; Y10T 403/7066; Y10T 403/7067; Y10T 403/7069;
(Continued)

(56) References Cited

U.S. PATENT DOCUMENTS 5,363,622 A * 11/1994 Sauer ...................... E04B 9/068
52/506.07
5,901,528 A * 5/1999 Richardson ............. E04C 2/543
52/582.1
(Continued)

FOREIGN PATENT DOCUMENTS

CN 205081722 U * 3/2016
CN 205792394 U 12/2016
(Continued)

OTHER PUBLICATIONS

International Search Report mailed Jun. 23, 2023 in corresponding PCT/CN2023/092662, 7 pages.
(Continued)

*Primary Examiner* — Amber R Anderson
*Assistant Examiner* — Kevin J Baynes
(74) *Attorney, Agent, or Firm* — HOVEY WILLIAMS LLP

(57) ABSTRACT

The present application provides a profile pressing component used to combine and fix profiles with side grooves. The profile pressing component includes a first mounting block and a second mounting block. The first mounting block includes a first combining part and a first fixing part. The first combining part extends upward from one end of the first fixing part in the width direction and is suitable for being clamped into the side groove of a profile, and the first fixing part is provided with at least one first convex strip on its bottom surface. The second mounting block includes a second combining part and a second fixing part. The second combining part extends upward from one end of the second fixing part in the width direction and is suitable for being clamped into the side groove of another profile, and the second fixing part has at least one hook at the other end in the width direction. When the first mounting block and the second mounting block are combined in the width direction, (Continued)

the at least one hook is adapted to hook the at least one first convex strip to limit the relative movement of the first fixing part and the second fixing part in the width direction.

10 Claims, 8 Drawing Sheets

(51) Int. Cl.
  *F24S 25/60*           (2018.01)
  *H02S 30/10*           (2014.01)

(58) Field of Classification Search
  CPC ..... Y10T 403/7092; E04B 2/885; E04B 2/96;
        E04B 2/967; E04B 2001/389; F16B
        5/0012; F16B 5/0016; F16B 5/126; F16B
        7/0473; F16B 7/22; H02S 30/10; F24S
        25/632; F24S 25/634; F24S 2025/6002;
        F24S 2025/6003
  USPC .................................. 403/363, 380; 52/173.3
  See application file for complete search history.

(56)                References Cited

U.S. PATENT DOCUMENTS

| | | | | |
|---|---|---|---|---|
| 6,347,495 | B1 * | 2/2002 | Conterno | E04D 3/08 |
| | | | | 248/223.41 |
| 6,368,011 | B1 * | 4/2002 | LaFountain | G09F 13/0413 |
| | | | | 403/363 |
| 8,640,402 | B1 * | 2/2014 | Bilge | E04D 13/103 |
| | | | | 52/173.3 |
| 8,910,928 | B2 * | 12/2014 | Header | F16B 2/065 |
| | | | | 52/24 |
| 9,175,878 | B2 * | 11/2015 | Kemmer | F24S 25/636 |
| 9,431,953 | B2 * | 8/2016 | Stearns | F24S 25/634 |
| 9,518,596 | B2 * | 12/2016 | West | F24S 25/61 |
| 9,850,661 | B2 * | 12/2017 | Kovacs | E04D 13/10 |
| 9,951,972 | B2 * | 4/2018 | Miyamoto | F24S 25/65 |
| 10,148,218 | B2 * | 12/2018 | Kanbara | H02S 20/23 |
| 10,742,162 | B2 * | 8/2020 | Kobayashi | H02S 20/23 |
| 11,296,648 | B1 | 4/2022 | Jasmin et al. | |
| 11,313,591 | B1 * | 4/2022 | Atia | F24S 25/636 |
| 12,203,496 | B2 * | 1/2025 | Moss | H02S 30/00 |

| | | | | |
|---|---|---|---|---|
| 2010/0282290 | A1 * | 11/2010 | Schwarze | H02S 20/24 |
| | | | | 136/244 |
| 2017/0104442 | A1 * | 4/2017 | MacRostie | H02S 20/23 |
| 2018/0119425 | A1 * | 5/2018 | Kovacs | F24S 25/615 |
| 2018/0183381 | A1 * | 6/2018 | Kanbara | F24S 25/636 |
| 2022/0302871 | A1 * | 9/2022 | Young | H02S 20/10 |

FOREIGN PATENT DOCUMENTS

| | | | | | |
|---|---|---|---|---|---|
| CN | 208158525 | U | 11/2018 | | |
| CN | 111865190 | | 10/2020 | | |
| CN | 211830684 | | 10/2020 | | |
| CN | 212305210 | U * | 1/2021 | | |
| CN | 113668760 | | 11/2021 | | |
| CN | 214995367 | U | 12/2021 | | |
| CN | 215773022 | | 2/2022 | | |
| CN | 216873142 | U | 7/2022 | | |
| CN | 217335520 | U | 8/2022 | | |
| CN | 116073752 | | 5/2023 | | |
| DE | 102009018782 | B3 * | 9/2010 | ............. | E04D 3/366 |
| DE | 202011003600 | U1 | 10/2011 | | |
| EP | 2410260 | | 1/2012 | | |

OTHER PUBLICATIONS

Machine Translation of CN116073752, 11 pages.
Machine Translation of CN111865190, 14 pages.
Machine Translation of CN113668760, 6 pages.
Machine Translation of CN211830684, 7 pages.
Machine Translation of CN215773022, 12 pages.
Machine Translation of EP2410260, 11 pages.
Search Report mailed Sep. 4, 2024, in corresponding European patent application No. EP 203813252.6, 7 pages.
Office Action (Original Chinese) mailed Jan. 24, 2025, in corresponding Chinese Patent Application No. 202211398992.9, 8 pages.
Office Action (English Translation) mailed Jan. 24, 2025, in corresponding Chinese Patent Application No. 202211398992.9, 8 pages.
Office Action (Original Chinese) mailed May 9, 2025, in corresponding Chinese Patent Application No. 202211398992.9, 11 pages.
Office Action (English Translation) mailed May 9, 2025, in corresponding Chinese Patent Application No. 202211398992.9, 11 pages.

* cited by examiner

100

A ←——————→ A'

100

A ⟵⟶ A'

<u>100'</u>

<u>100'</u>

PROFILE PRESSING COMPONENT

CROSS-REFERENCE TO RELATED APPLICATIONS

The present non-provisional patent application claims priority to International Patent Application No. PCT/CN2023/092662, filed May 8, 2023, and entitled "PROFILE PRESSING COMPONENT," and to Chinese Patent Application No. 202211398992.9, filed Nov. 9, 2022, and entitled "PROFILE PRESSING COMPONENT." The entireties of both above-identified international patent application and Chinese patent application are hereby incorporated by reference into the present non-provisional patent application.

TECHNICAL FIELD

The present application mainly relates to the installation frame of a photovoltaic module, especially to a profile pressing component.

BACKGROUND

A solar photovoltaic module contains a solar cell laminate and a profile surrounding the edge of the solar cell laminate. The function of the profile is to enhance the mechanical strength of the solar cell and seal the edges of the solar cell. During the actual installation process, it is further necessary to use profile pressing pieces to secure the photovoltaic modules with profiles and the brackets.

Currently, photovoltaic modules are usually installed using bottom bolts or using pressing pieces between adjacent modules. In the existing bolt installation method, the installation holes are located on the bottom extension surface of the frame. Due to the demand for cost reduction of photovoltaic modules in recent years, the wall thickness and width of the mounting surface have been reduced, which has led to a reduction in the strength of the module mounting surface, and bolt holes often deform or even fail due to stress. Meanwhile, due to the increase in the size of the components and the increase in the load on the pressing pieces in the existing pressing pieces installation method, it is easy to cause deformation of the pressing pieces and cause the photovoltaic modules to slip out. The above two installation methods are more difficult to install heavier components on taller brackets.

SUMMARY

The technical problem to be solved by the present application is to provide a profile pressing component with stronger load-bearing capacity and greater strength.

In order to solve the above technical problems, the present application provides a profile pressing component, which is used to combine and fix profiles. The profile pressing component includes a first mounting block and a second mounting block. The first mounting block includes a first combining part and a first fixing part, the first combining part extends upward from one end of the first fixing part in the width direction and is suitable for being clamped into the side groove of a profile, and the first fixing part is provided with at least one first convex strip on its bottom surface. The second mounting block includes a second combining part and a second fixing part, wherein the second combining part extends upward from one end of the second fixing part in the width direction and is suitable for being clamped into the side groove of another profile, and the second fixing part has at least one hook at the other end in the width direction, and wherein when the first mounting block and the second mounting block are combined in the width direction, the at least one hook is adapted to hook at least one first convex strip to limit the relative movement of the first fixing part and the second fixing part in the width direction.

In one embodiment of the present application, the first fixing part is also provided with a second convex strip on its bottom surface, the second convex strip is close to the first combining part, and when the first mounting block is installed on a photovoltaic bracket, the first convex strip and the second convex strip are attached to the photovoltaic bracket, and there is a gap allowing the second mounting block to enter between the bottom surface of the first fixing part and the photovoltaic bracket.

In one embodiment of the present application, both the first combining part and the second combining part have a first protrusion and a second protrusion, and when the first combining part and the second combining part connect the side groove, the first protrusion is adapted to snap into the top of the side groove, and the second protrusion is adapted to snap into the bottom of the side groove.

In one embodiment of the present application, the first combining part includes a first side plate, a first bottom plate and a first reinforcing plate. The first side plate extends upward from one end of the first bottom plate, the first reinforcing plate is connected between the upper end of the first side plate and the other end of the first bottom plate. The first protrusion is located at the upper end of the first side plate, and the second protrusion is located at the lower end of the first side plate.

In one embodiment of the present application, a first groove is provided between the second protrusion and the second convex strip, and the first groove is adapted to engage with a lower notch of the side groove.

In one embodiment of the present application, the second combining part includes a second side plate, a second bottom plate and a second reinforcement plate. The second side plate extends upward from one end of the second bottom plate, and the second reinforcement plate is connected between an upper end of the second side plate and the other end of the second bottom plate. The first protrusion is located at the upper end of the second side plate, and the second protrusion is located at a lower end of the second side plate.

In one embodiment of the present application, a second groove is provided between the second protrusion and the second bottom plate, and the second groove is adapted to engage with a lower notch of the side groove.

In one embodiment of the present application, when a plurality of first protrusions are provided on the bottom surface of the first fixing part, there is a plug-in interval between two adjacent first protrusions, and the plug-in interval is larger than a length of a hook portion of the hook.

In one embodiment of the present application, the first fixing part futher includes a fastening hole, and a fastener is adapted to pass through the fastening hole to fix the first mounting block on a photovoltaic bracket.

In one embodiment of the present application, the first side plate further includes a limiting fastening hole, a limiting fastener is adapted to pass through the limiting fastening hole to fix the first combining part and the profile; and/or the first side plate further includes a limiting protrusion, a limiting groove is correspondingly provided in the side groove, and the limiting protrusion is suitable for being snapped into the limiting groove.

In one embodiment of the present application, the second side plate further includes a limiting protrusion, a limiting groove is correspondingly provided in the side groove, and the limiting protrusion is adapted to snap into the limiting groove; and/or the second side plate further includes a limiting fastening hole, and a limiting fastener is adapted to pass through the limiting fastening hole to fix the second combining part and another profile.

Another aspect of the present application also provides a method for installing the profile pressing component. The profile pressing component includes a first mounting block and a second mounting block. The first mounting block includes a first combining part and a first fixing part, wherein the first combining part extends upward from one end of the first fixing part in the width direction, and the first fixing part is provided with at least one first convex strip on its bottom surface. The second mounting block includes a second combining part and a second fixing part, wherein the second combining part extends upward from one end of the second fixing part in the width direction, and the second fixing part has at least one hook at the other end in the width direction. The method includes the following steps: installing the first mounting block on one profile, and installing the second mounting block on another profile; fixing the first mounting block on a photovoltaic bracket through a fastener, placing the second mounting block on the photovoltaic bracket so that the second fixing part is opposite to the first fixing part, and the hook and the first convex strip are stagger in the length direction of the profile; translating the second mounting block along the width direction so that the hook passes over the first convex strip; and moving the second mounting block along the length direction of the profile, so that the hook hooks the first convex strip, and the hook is located between the first mounting block and the photovoltaic bracket.

Compared with the prior art, the profile pressing component of the present application is connected and fixed by plugging and hanging, the installation and disassembly process does not rely on fastening components such as screws, compared with the existing connection method, it is more flexible and more convenient to install and disassemble.

BRIEF DESCRIPTION OF THE DRAWINGS

The drawings are included to provide a further understanding of the present application, and they are included and constitute a part of the present application, the drawings show the embodiments of the present application, and serving to explain the principles of the present application together with the description. In the drawings.

4

Figure 3A:
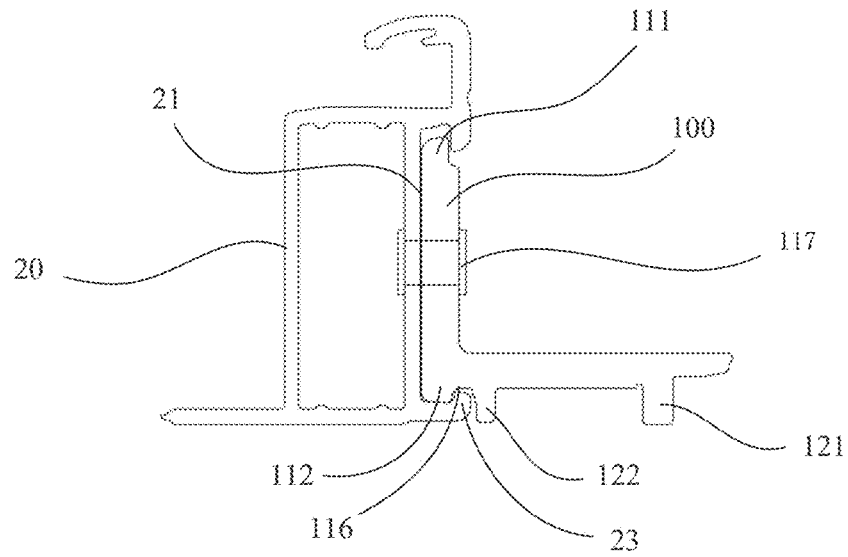
FIG. 3A is a schematic diagram of the combination of a first mounting block and a profile according to the first embodiment of the present disclosure.
Figure 3B:
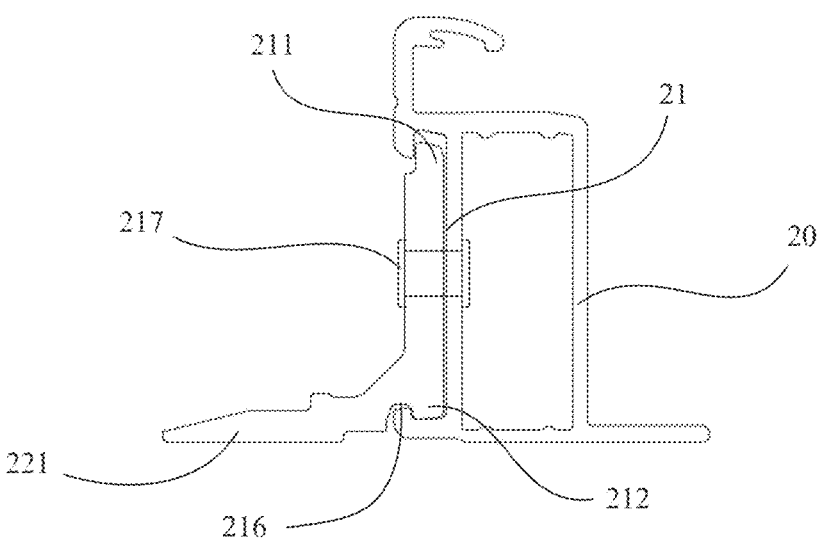

FIG. 3B is a schematic diagram of the combination of a second mounting block and a profile according to the first embodiment of the present disclosure.

Figure 4:
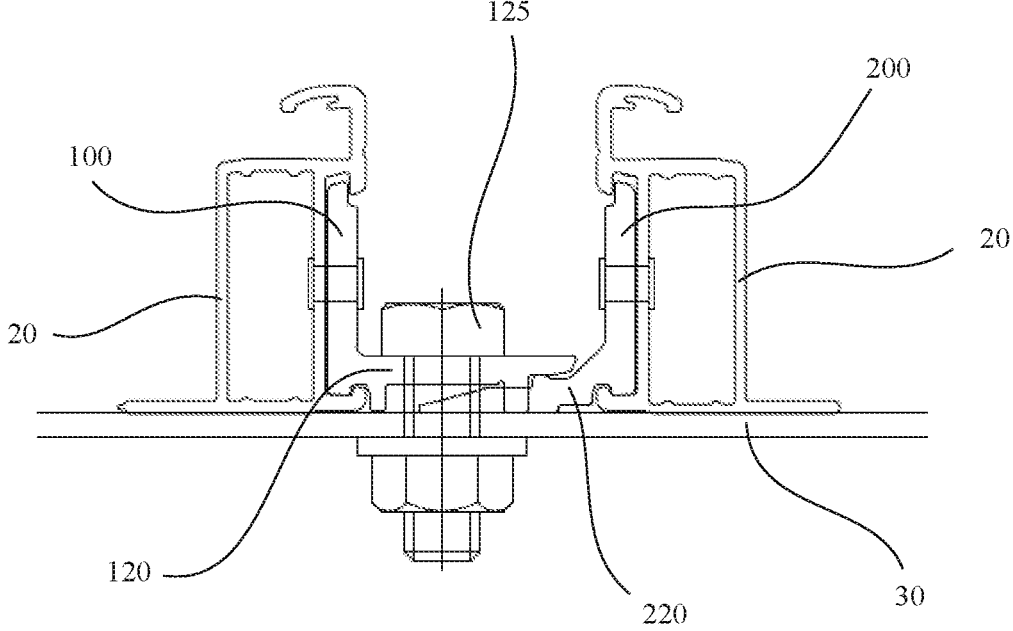

FIG. 4 is a schematic diagram of the combination of a profile pressing component and a profile according to the first embodiment of the present disclosure.

Figure 5A:
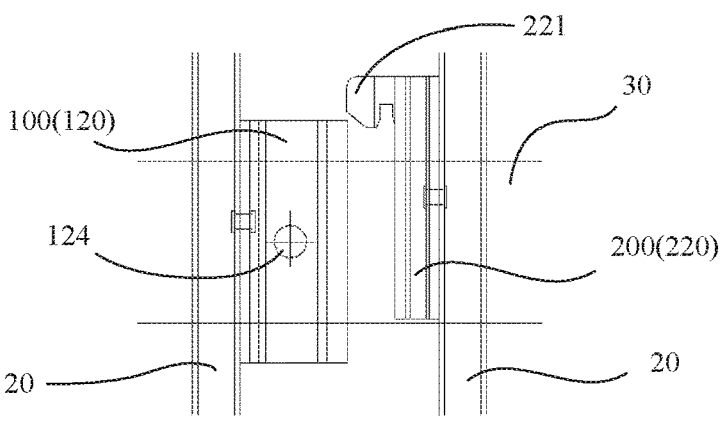
Figure 5B:
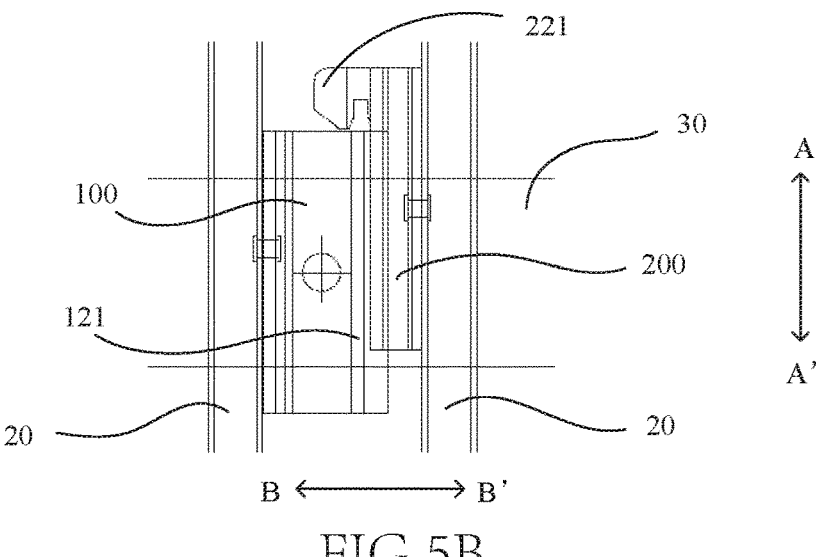
Figure 5C:
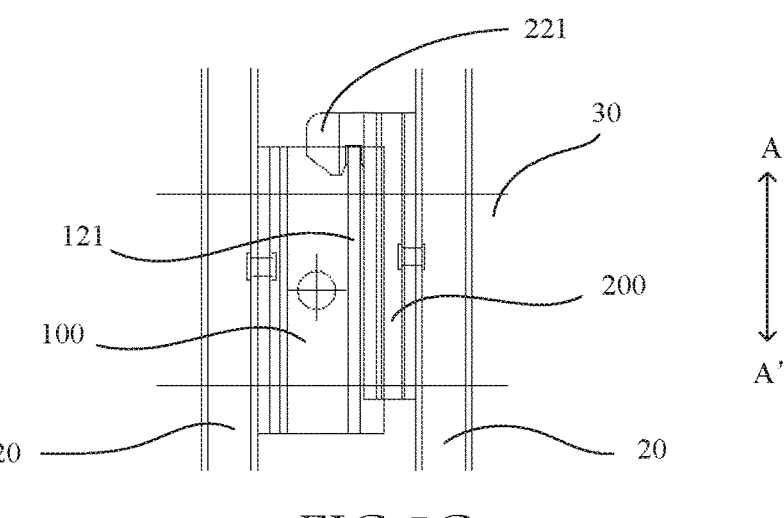

FIGS. 5A-5C are schematic diagrams of the process of combining a profile pressing component and a profile according to the first embodiment of the present disclosure.

Figure 6A:
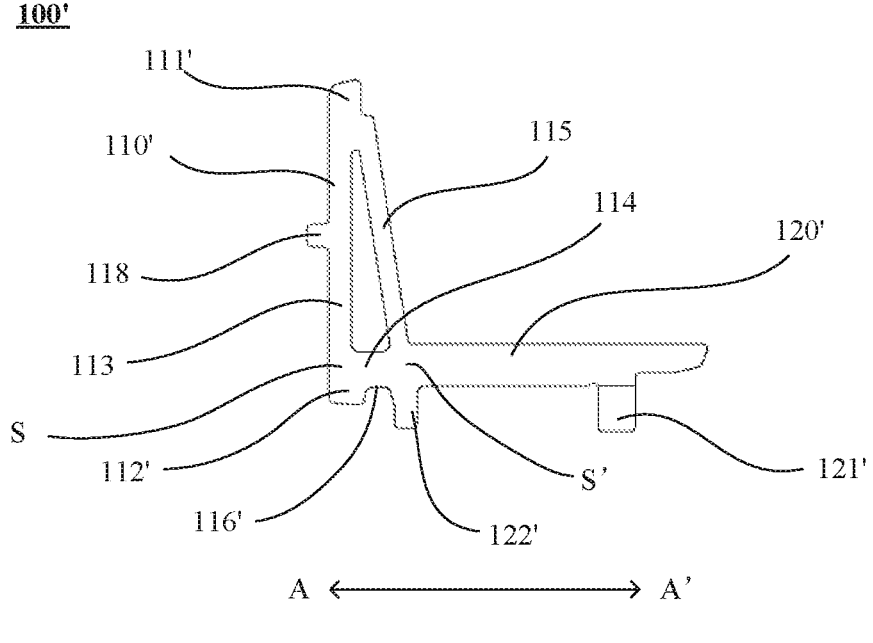

FIG. 6A is a schematic cross-sectional view of a first mounting block according to a second embodiment of the present disclosure.

Figure 6B:
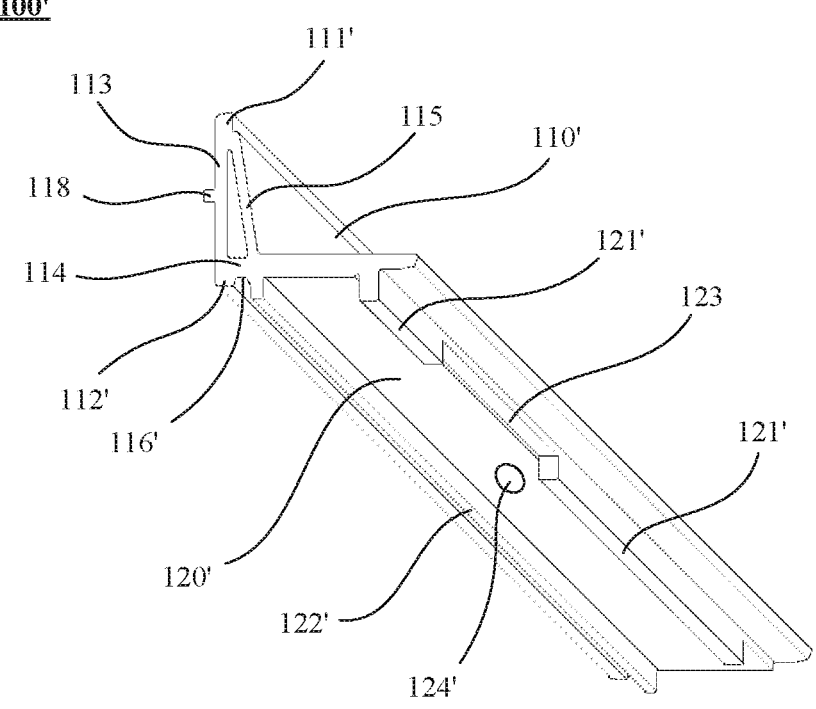

FIG. 6B is a schematic three-dimensional view of a first mounting block according to the second embodiment of the present disclosure.

Figure 7A:
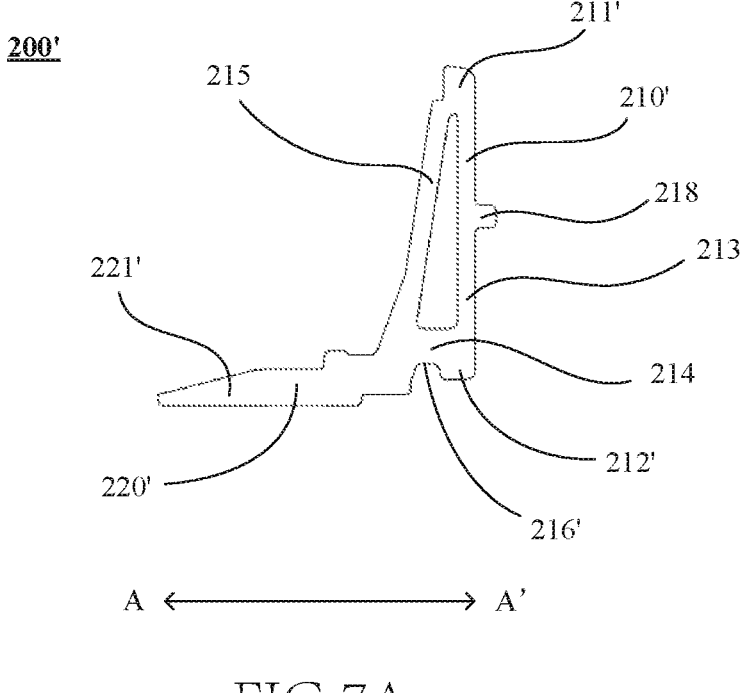

FIG. 7A is a schematic cross-sectional view of a second mounting block according to the second embodiment of the present disclosure.

Figure 7B:
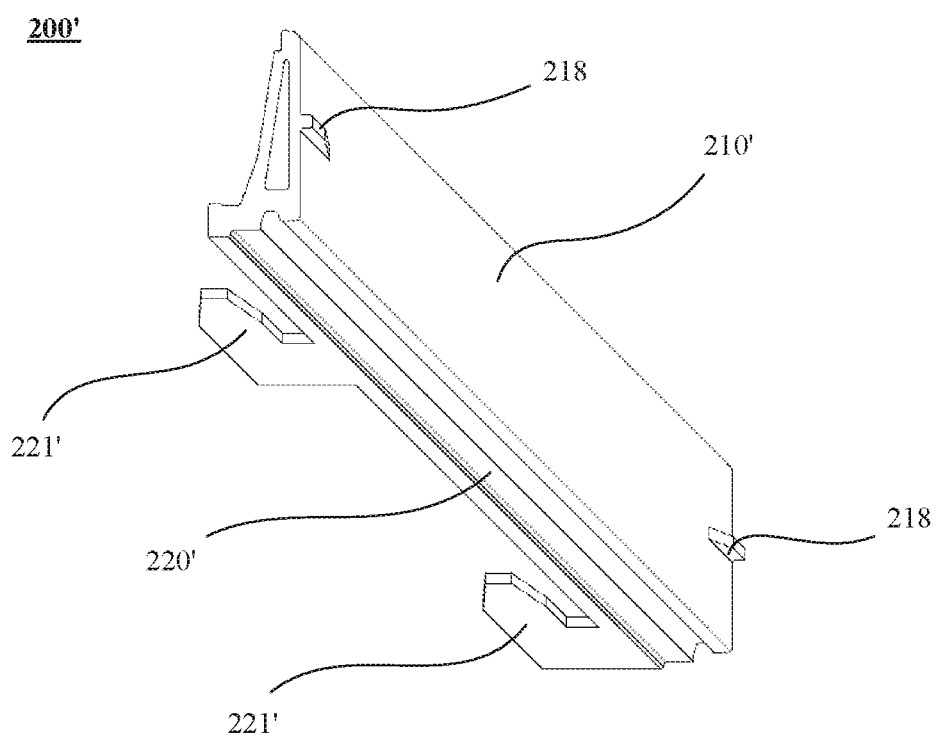

FIG. 7B is a schematic three-dimensional view of a second mounting block according to the second embodiment of the present disclosure.

Figure 8A:
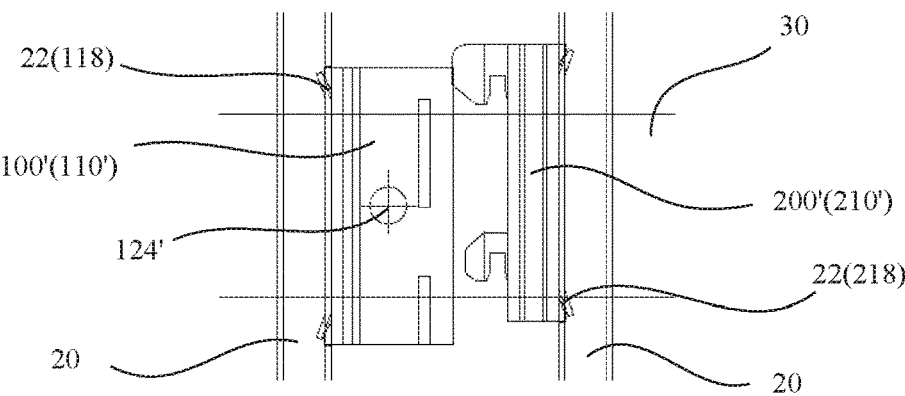
Figure 8B:
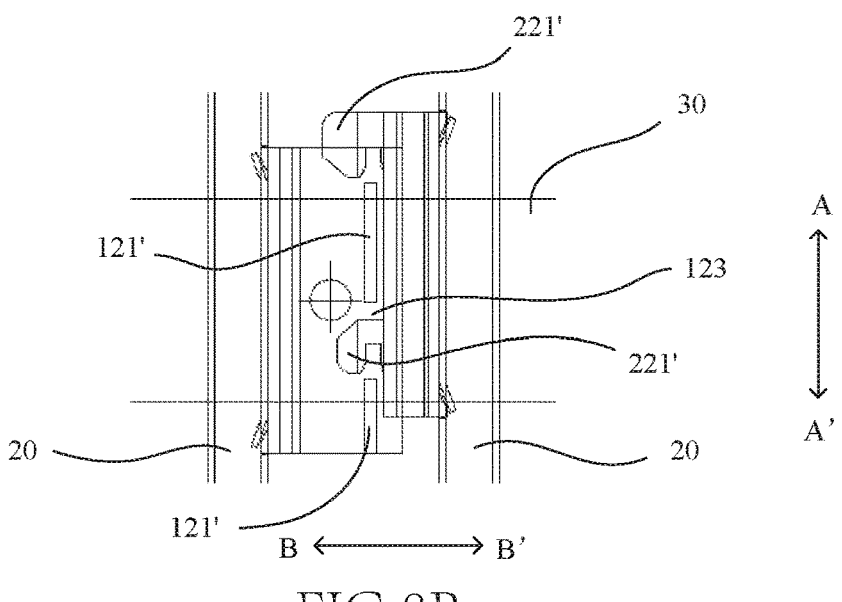
Figure 8C:
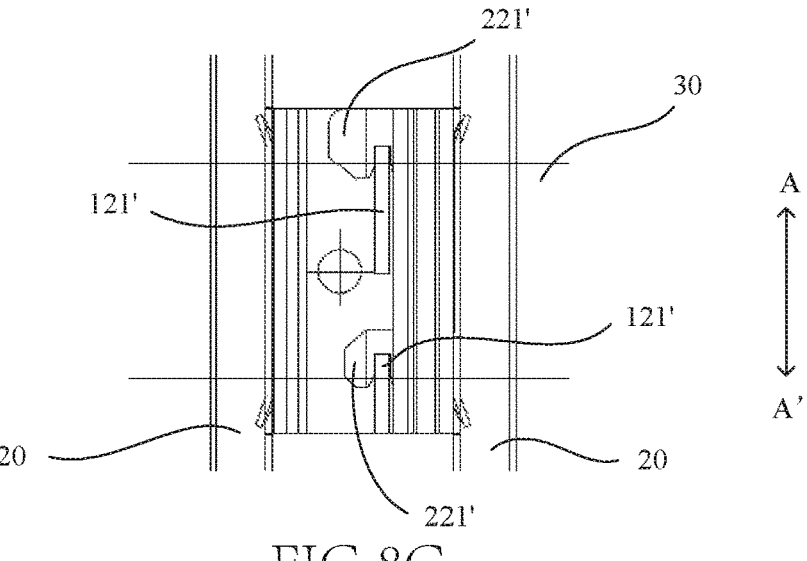

FIGS. 8A-8C are schematic diagrams of the process of combining a profile pressing component and a profile according to the second embodiment of the present disclosure.

The reference numbers in FIGS. 1A-8C are as follows:

| Profile pressing component | 10 | | | |
|---|---|---|---|---|
| First mounting block | 100、 | 100' | | |
| First combining part | 110、 | 110' | | |
| First protrusion | 111、 | 211、 | 111'、 | 211' |
| Second protrusion | 111、 | 211、 | 112'、 | 212' |
| First side plate | 113 | | | |
| First bottom plate | 114 | | | |
| First reinforcing plate | 115 | | | |
| First groove | 116、 | 116' | | |
| Limiting fastener | 117、 | 217 | | |
| Limiting protrusion | 118、 | 218 | | |
| First fixing part | 120、 | 120' | | |
| First convex strip | 121、 | 121' | | |
| Second convex strip | 122、 | 122' | | |
| Plug-in interval | 123 | | | |
| Fastening hole | 124、 | 124' | | |
| Fastener | 125 | | | |
| Second mounting block | 200、 | 200' | | |
| Second combining part | 210、 | 210' | | |
| Second side plate | 213 | | | |
| Second bottom plate | 214 | | | |
| Second reinforcing plate | 215 | | | |
| Second groove | 216、 | 216' | | |
| Second fixing part | 220、 | 220' | | |
| Hook | 221、 | 221' | | |
| Profile | 20 | | | |
| Side groove | 21 | | | |
| Limiting groove | 22 | | | |
| Lower notch | 23 | | | |
| Photovoltaic bracket | 30 | | | |

PREFERRED EMBODIMENT OF THE PRESENT DISCLOSURE

In order to illustrate the technical solutions in the embodiments of the present application more clearly, the drawings that need to be used in the description of the embodiments will be briefly introduced below. Obviously, the drawings in the following description are only some embodiments of the present application, and for those skilled in the art, other drawings can also be obtained based on these drawings without creative effort.

As indicated in this application and claims, the terms "a", "an", "a kind of" and/or "the" do not specifically refer to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The relative arrangements of components and steps, numerical expressions and numerical values set forth in these embodiments do not limit the scope of the present application unless specifically stated otherwise. At the same time, it should be understood that, for the convenience of description, the sizes of the various parts shown in the drawings are not drawn according to the actual proportional relationship. Techniques, methods and devices known to those of ordinary skill in the relevant art may not be discussed in detail, but where appropriate, such techniques, methods and devices should be considered part of the authorized specification. In all embodiments shown and discussed herein, any specific values should be construed as illustrative only, and not as limiting. Therefore, other examples of the exemplary embodiment may have different values. It should be noted that like numerals and letters denote like items in the following figures, therefore, once an item is defined in one figure, it does not require further discussion in subsequent drawings.

In the description of the present application, it should be understood that orientation words such as "front, back, up, down, left, right", "landscape, portrait, vertical, horizontal" and "top, bottom" etc. indicating the orientation or positional relationship is generally based on the orientation or positional relationship shown in the drawings, only for the convenience of describing the application and simplifying the description, in the absence of a contrary statement, these orientation words do not indicate or imply that the device or element referred to must have a specific orientation or be constructed and operated in a specific orientation, and therefore cannot be construed as limiting the scope of protection of this application; the orientation words "inside and outside" refer to inside and outside relative to the outline of each part itself.

For the convenience of description, spatially relative terms may be used here, such as "on . . . ", "over . . . ", "on the upper surface of . . . ", "above", etc., to describe the spatial positional relationship between one device or feature and other devices or features. It will be understood that, in addition to the orientation depicted in the drawings, the spatially relative terms are intended to encompass different orientations of the device in use or operation. For example, if the device in the drawings is turned over, devices described as "on other devices or configurations" or "above other devices or configurations" would then be oriented "beneath other devices or configurations" or "under other devices or configurations". Thus, the exemplary term "above" can encompass both an orientation of "above" and "beneath". The device may be otherwise oriented (rotated 90 degrees or at other orientations), and making a corresponding explanation for the space relative description used here.

In addition, it should be noted that the use of words such as "first" and "second" to define components is only for the convenience of distinguishing corresponding components, unless otherwise stated, the above words have no special meanings, and therefore cannot be construed as limiting the protection scope of the present application. In addition, although the terms used in this application are selected from well-known and commonly used terms, some terms mentioned in the specification of this application may be selected by the applicant according to his or her judgment, and their detailed meanings are listed in this article described in the relevant section of the description. Furthermore, it is required that this application be understood not only by the actual terms used, but also by the meaning implied by each term.

First Embodiment

FIG. 4 is a schematic diagram of the combination of a profile pressing component and a profile according to the first embodiment of the present disclosure. Referring to FIG. 4, a profile pressing component 10 provided by the present disclosure includes a first mounting block 100 and a second mounting block 200, and the profile pressing component 10 is suitable for combining and fixing profiles 20. Specifically, as shown in FIG. 4, the first mounting block 100 and the second mounting block 200 in the profile pressing component 10 provided by the present application are respectively suitable for snapping with the two profiles 20.

Figure 1A:
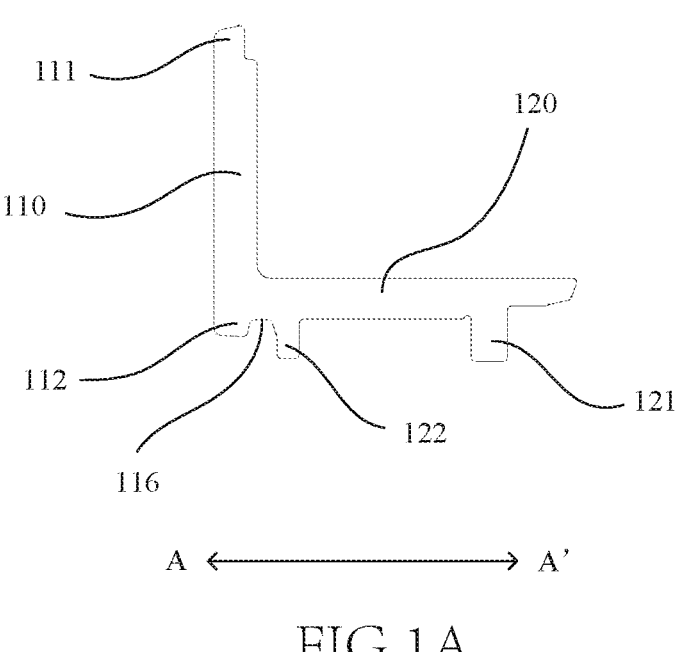
FIG. 1A is a schematic cross-sectional view of a first mounting block according to a first embodiment of the present disclosure.
Figure 1B:
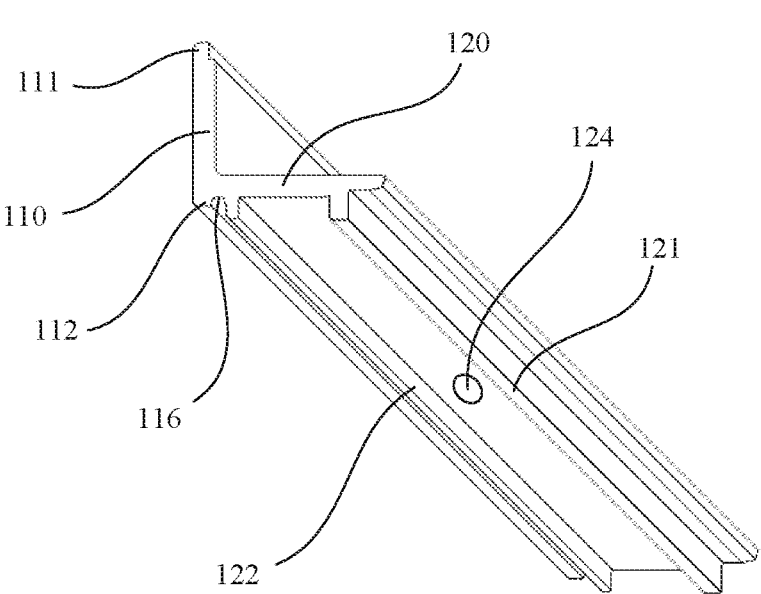
FIG. 1B is a schematic three-dimensional view of a first mounting block according to the first embodiment of the present disclosure.

FIG. 1A is a schematic cross-sectional view of a first mounting block according to the first embodiment of the present disclosure; FIG. 1B is a schematic three-dimensional view of a first mounting block according to the first embodiment of the present disclosure; FIG. 3A is a schematic diagram of the combination of a first mounting block and a profile according to the first embodiment of the present disclosure. With reference to FIGS. 1A-1B and 3A, in this embodiment, the first mounting block 100 includes a first combining part 110 and a first fixing part 120, and the first combining part 110 extends upward from one end (the left end in the picture) in the width direction (i.e., AA' direction as shown in FIG. 1A) of the first fixing part 120. The first mounting block 100 is suitable for snapping with a profile through the first combining part 110, specifically, the first combining part 110 snaps into the side groove 21 of the profile 20.

In this embodiment, as shown in FIG. 1A, a first convex strip 121 is provided on the bottom surface of the first fixing part 120, and the first convex strip 121 is suitable for connecting with the second mounting block 200. The first convex strip 121 is close to the other end (right end in the figure) of the first fixing part 120 in the width direction. Furthermore, in order to enhance the stability of the first mounting block 100, in this embodiment, a second convex strip 122 is also provided on the bottom surface of the first fixing part 120 which is close to the first combining part 110, and as shown in FIG. 1A the second convex strip 122 is located on the left side of the first convex strip 121. When the first mounting block 100 is installed on a photovoltaic bracket (not shown), the first convex strip 121 and the second convex strip 122 are both attached to the photovoltaic bracket. It can be understood that the first convex strips 121 and the second convex strips 122 are arranged so that after the first mounting block 100 is installed on the photovoltaic bracket, there is a gap between the bottom surface of the first fixing part 120 and the photovoltaic bracket.

Figure 2A:
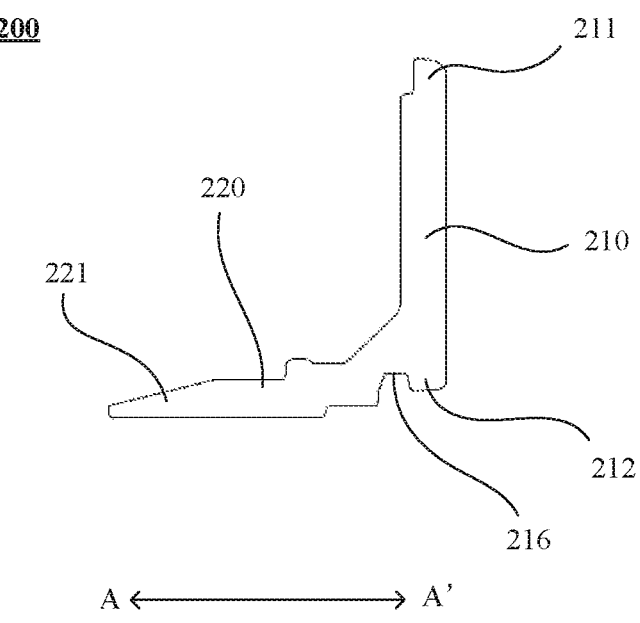
FIG. 2A is a schematic cross-sectional view of a second mounting block according to the first embodiment of the present disclosure.
Figure 2B:
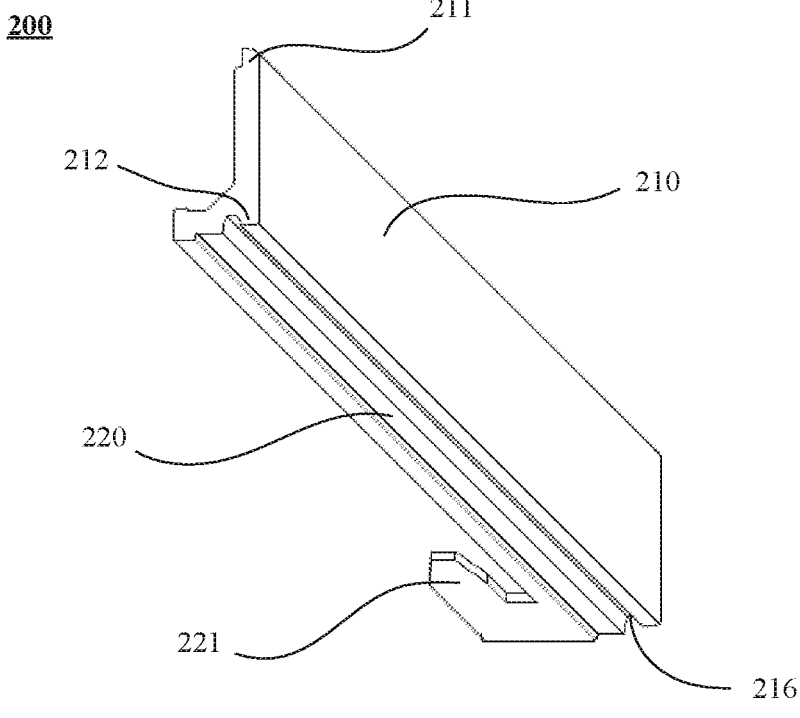
FIG. 2B is a schematic three-dimensional view of a second mounting block according to the first embodiment of the present disclosure.

FIG. 2A is a schematic cross-sectional view of a second mounting block according to the first embodiment of the present disclosure; FIG. 2B is a schematic three-dimensional view of a second mounting block according to the first embodiment of the present disclosure; FIG. 3B is a schematic diagram of the combination of a second mounting block and a profile according to the first embodiment of the present disclosure. With reference to FIGS. 2A-2B and 3B, in this embodiment, the second mounting block 200 includes a second combining part 210 and a second fixing part 220, and the second combining part 210 extends upward from one end in the width direction (i.e., AA' direction as shown in FIG. 2A) of the second fixing part 220. The second mounting block 200 is suitable for snapping with a profile 20 through the second combining part 210. Specifically, the second combining part 210 snaps into the side groove 21 of the profile 20.

In this embodiment, the second fixing part 220 has a hook 221 on the other end away from the second combining part 210 (i.e., the left end as shown in FIG. 2A), and the hook 221 extends toward the outside (the left side in the figure) of the second fixing part 220. Referring further to FIG. 4, when the corresponding first mounting block 100 and second mounting block 200 are combined in the width direction, the hook 221 is adapted to hook the first convex strip 121 to limit the relative movement of the first fixing part 120 and the second fixing part 120 in the width direction as shown in the figure (i.e., the AA' direction shown in FIG. 2A), thereby restricting the relative movement of the first mounting block 100 and the second mounting block 200 in the width direction, completing the positioning of the two adjacent profiles 20 in this direction. It can be understood that in this embodiment, the hook 221 is adapted to enter the gap existing between the bottom surface of the first fixing part 120 and the photovoltaic bracket. As mentioned above, the gap is formed by the first convex strip 121 and the second convex strip 122.

A preferred embodiment of the present application is shown in FIGS. 1A-1B and 3A. In this embodiment, the first combining part 110 also has a first protrusion 111 and a second protrusion 112. When the first combining part 110 and the profile are engaged, the first protrusion 111 snaps into the top of the side groove 21, and the second protrusion 112 snaps into the bottom of the side groove 21. It is not easy for the profile pressing component to come out due to the restriction of the notch of the side groove 21, thereby enhancing the fixing effect.

Furthermore, in this embodiment, the bottom of the first mounting block 100 also has a first groove 116 located between the second protrusion 112 and the second convex strip 122. When the first mounting block 100 is clamped with the profile 20, the lower notch 23 of the side groove 21 of the profile 20 is clamped into the first groove 116.

Similarly, a preferred embodiment of the present application is shown in FIGS. 2A-2B and 3B. In this embodiment, the second combining part 210 also has a first protrusion 211 and a second protrusion 212. When the second combining part 210 and the profile 20 are engaged, the first protrusion 211 is clamped in the top of the side groove 21, and the second protrusion 212 is clamped in the bottom of the side groove 21, which also enhances the fixing effect.

Furthermore, in this embodiment, the second mounting block 200 also has a second groove 216 at the bottom which is located between the second protrusion 212 and the second fixing part 220. When the second mounting block 200 is connected to the profile 20, the lower notch of the side groove 21 of the profile 20 is clamped into the second groove 216.

Referring to FIG. 4, in this embodiment, the first fixing part 120 of the first mounting block 100 also includes a fastening hole 124 (not shown in FIG. 4, please refer to FIG. 5A), through which a fastener 125 passes to fix the first mounting block 100 on the photovoltaic bracket 30.

FIG. 5A-5C are schematic diagrams of the process of combining a profile pressing component and a profile according to the first embodiment of the present disclosure.

With reference to FIGS. 5A-5C, the process steps of combining a profile pressing component and the profiles in this embodiment are as follows:

Step 1: Referring to FIG. 5A, first install the first mounting block 100 on one profile 20, and install the second mounting block 200 on another profile 20;

Step 2: Place a photovoltaic module (not shown) connected to the one profile 20 on the photovoltaic bracket 30, and fix the first mounting block 100 on the photovoltaic bracket 30 through the fastener 125 (not shown) and the fastening holes 124, place a photovoltaic module (not shown) connected to the another profile 20 on the photovoltaic bracket 30, so that the second fixing part 220 of the second mounting block 200 and the first fixing part 120 of the first mounting block 100 are opposite to each other;

Step 3: Referring to FIG. 5B, move the second mounting block 200 in the direction AA' as shown in the figure so that the hook 221 of the second mounting block 200 and the first protrusion 121 of the first mounting block 100 are staggered in the direction AA' in the figure; it can be understood that if the hook 221 and the first protrusion 121 are already staggered when the second fixing part 220 is opposite to the first fixing part 120 in step 2, this step can be omitted;

Step 4: Move the second mounting block 200 in the direction BB' as shown in the figure, so that the second mounting block 200 is close to the first mounting block 100, and the hook 221 crosses the first convex strip 121;

Step 5: Referring to FIG. 5C, move the second mounting block 200 downward along the direction AA' in the figure, so that the hook 221 hooks the first convex strip 121, and ensure that the hook 221 is located between the first mounting block 100 and the photovoltaic bracket 30.

It can be understood that when more than two photovoltaic modules are installed, the fixing method between two adjacent photovoltaic modules is the same as the previous steps, and when one side of the profile is connected to the second mounting block 200, the other side is connected to another first mounting block 100.

In this embodiment, as shown in FIG. 3A, in order to further enhance the connection between the corresponding profile 20 of the first mounting block 100, the first combining part 110 has a limit fastening hole (not shown), and the limiting fastener 117 passes through the limiting fastening hole to fix the first combining part 110 and the profile 20.

In this embodiment, as shown in FIG. 3B, in order to further enhance the connection between the corresponding profile 20 of the second mounting block 200, the second combining part 210 has a limiting fastening hole (not shown), and the limiting fastener 217 passes through the limiting fastening hole to fix the second combining part 210 and the profile 20.

Second Embodiment

FIG. 6A is a schematic cross-sectional view of a first mounting block according to the second embodiment of the present disclosure; FIG. 6B is a schematic three-dimensional view of a first mounting block according to the second embodiment of the present disclosure; FIG. 7A is a schematic cross-sectional view of a second mounting block according to the second embodiment of the present disclosure; FIG. 7B is a schematic three-dimensional view of a second mounting block according to the second embodiment of the present disclosure. With the reference of FIG. 6A-6B, the main difference between the profile pressing component provided in this embodiment and the previous embodiment is that in this embodiment, the bottom surface of the first fixing part 120' of the first mounting block 100' is provided with two first protrusions 121' which are arranged at intervals in the length direction of the profile. Correspondingly, The second fixing part 220' (as shown on the left in FIG. 7A) of the second mounting block 200' has two hooks 221' at the other end in the width direction (AA' direction as shown in FIG. 7A) extending outwardly (to the left in FIG. 7B) of the second fixing part 220'. When the first mounting block 100' and the second mounting block 200' are combined in the width direction, the hook 221' is adapted to hook the corresponding first convex strip 121', thereby limiting the relative movement of the first fixing part 121' and the second fixing part 220' in the width direction, thereby further limiting the relative movement of the first mounting block 100' and the second mounting block 200' in the width direction.

Specifically, in this embodiment, there is a plug-in interval 123 between two adjacent first convex strips 121', and the distance between the plug-in interval 123 is greater than the length of the hook portion of the corresponding hook 221', so that each hook 221' can insert into each plug-in interval 123 to complete the hooking of the first convex strip 121'.

Further, in order to enhance the strength and support of the first mounting block 100', the cross section of the first combining part 110' in this embodiment is triangular. As shown in FIGS. 6A-6B, the first combining part 110' includes a first side plate 113, a first bottom plate 114 and a first reinforcing plate 115, wherein the first bottom plate 114 of the first combining part 110' extends outward from the left side as shown in FIG. 6A of the first fixing part 120', the first side plate 113 extends upward from one end S (as shown in FIG. 6A, the left end) of the first bottom plate 114, and the first reinforcing plate 115 is connected between the upper end of the first side plate 113 and the other end S' (as shown in FIG. 6A, the right end) of the first bottom plate 114. In this embodiment, the first protrusion 111' is located at the upper end of the first side plate 113, and the second protrusion 112' is located at the lower end of the first side plate 113. In this embodiment, the first combining part 110' extends upward from one end (the left end in the figure) of the first fixing part 120' in the width direction (i.e., direction AA' as shown in FIG. 6A).

Similarly, in order to enhance the strength and support of the second mounting block 200' as shown in FIGS. 7A-7B, the cross section of the second combining part 210' in this embodiment is also triangular, and the second combining part 210' includes a second side plate 213, second bottom plate 214 and second reinforcing plate 215. The second bottom plate 214 of the second combining part 210' extends outward from the right side of the second fixing part 220' as shown in FIG. 7A, and the second side plate 213 extends upward from one end (as shown in FIG. 7A, the right end) of the second bottom plate 214, and the second reinforcing plate is connected between the upper end of the second side plate 213 and the other end (as shown in FIG. 7A, the left end) of the second bottom plate 214. In this embodiment, the second combining part 210' extends upward from one end in the width direction of the second fixing part 220' (i.e., direction AA' as shown in FIG. 7A).

It can be understood that in this embodiment, the first protrusion 211' is located at the upper end of the second side plate 213, the second protrusion 212' is located at the lower end of the second side plate 213, and the second groove 216' is located at the second protrusion 211' and the second bottom plate 214.

In this embodiment, as shown in FIGS. 6A and 8A, in order to further enhance the connection between the corresponding profiles 20 of the first mounting block 100', the first combining part 110' has a limiting protrusion 118, and a limiting groove 22 is provided inside the corresponding side groove 21, the limiting protrusion 118 is suitable for snapping into the limiting groove 22.

In this embodiment, as shown in FIGS. 7A and 8A, in order to further enhance the connection between the corresponding profiles 20 of the second mounting block 200', the second combining part 210' has a limiting protrusion 218, and a limiting groove 22 is provided inside the corresponding side groove 21, the limiting protrusion 218 is suitable for snapping into the limiting groove 22.

FIG. 8A-8C are schematic diagrams of the process of combining a profile pressing component and a profile according to the second embodiment of the present disclosure. With reference to FIGS. 8A-8C, the process steps of combining a profile pressing component and the profile in this embodiment are as follows:

Step 1: Referring to FIG. 8A, first connect the first mounting block 100' to a profile 20, connect the second mounting block 200' to another profile 20, and place a photovoltaic module (not shown) connected to the one profile 20 on the photovoltaic bracket 30, and fix the first mounting block 100' on the photovoltaic bracket 30 by setting the fastener 125 (not shown) through the fastening hole 124', and then place the photovoltaic module connected to the another profile 20 on the photovoltaic bracket 30 so that the second fixing part 220' of the second mounting block 200' is opposite to the first fixing part 120' of the first mounting block 100';

Step 2: Referring to FIG. 8B, move the second mounting block 200' in the direction AA' as shown in the figure so that the hook 221' of the second mounting block 200' is staggered with the first protrusion 121' of the first mounting block 100' in the direction AA' as shown in the figure, and one of the hooks 221' is aligned with the plug-in interval 123, and move the second mounting block 200' in the direction BB' as shown in the figure, so that the second mounting block 200' is close to the first mounting block 100';

Step 3: Referring to FIG. 8C, move the second mounting block 200' downward along the direction AA' in the figure, so that the hook 221' is hooked to the corresponding first convex strip 121', and ensure that the hook 221' is located between the first mounting block 100' and the photovoltaic bracket 30.

It should be understood that when two or more photovoltaic modules are installed, the fixing method between two adjacent photovoltaic modules is the same as the previous steps, and when one side of the profile is connected to the second mounting block 200', another first mounting block 100' is installed on the opposite edge for the same reason as mentioned above.

It can be understood that in other embodiments of the present application, the number of the first convex strips 121' may be more, and the present application does not impose a specific limitation here.

The basic concepts have been described above, obviously, for those skilled in the art, the above disclosure of the disclosure is only an example, and does not constitute a limitation to the present application. Although not expressly stated here, various modifications, improvements and amendments to this application may be made by those skilled in the art. Such modifications, improvements, and amendments are suggested in this application, so such modifications, improvements, and amendments still belong to the spirit and scope of the exemplary embodiments of this application.

Meanwhile, the present application uses specific words to describe the embodiments of the present application. For example, "one embodiment", "an embodiment", and/or "some embodiments" refer to a certain feature, structure or characteristic related to at least one embodiment of the present application. Therefore, it should be emphasized and noted that two or more references to "one embodiment" or "an embodiment" or "an alternative embodiment" in different places in this specification do not necessarily refer to the same embodiment. In addition, certain features, structures or characteristics of one or more embodiments of the present application may be properly combined.

In the same way, it should be noted that in order to simplify the expression disclosed in the present application and help the understanding of one or more embodiments of the disclosure, in the foregoing description of the embodiments of the present application, sometimes multiple features are combined into one embodiment, drawings or descriptions thereof. However, this method of disclosure does not imply that the subject matter of the application requires more features than are recited in the claims. Indeed, embodiment features are less than all features of a single foregoing disclosed embodiment.

In some embodiments, numbers describing the quantity of components and attributes are used, it should be understood that such numbers used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the specification and claims are approximations that can vary depending upon the desired characteristics of individual embodiments. In some embodiments, numerical parameters should take into account the specified significant digits and adopt the general digit reservation method. Although the numerical ranges and parameters used in some embodiments of the present application to confirm the breadth of the scope are approximate values, in specific embodiments, such numerical values are set as precisely as practicable.

Although the present application has been described with reference to the current specific embodiments, those of ordinary skill in the art should recognize that the above embodiments are only used to illustrate the present application, and various equivalent changes or substitutions can also be made without departing from the spirit of the present application, therefore, as long as the changes and modifications to the above-mentioned embodiments are within the spirit of the present application, they will all fall within the scope of the claims of the present application.

The invention claimed is:

1. A profile pressing component, used to combine and fix profiles with side grooves, characterized by including a first mounting block and a second mounting block; wherein, the first mounting block includes a first combining part and a first fixing part, wherein the first combining part extends upward from one end of the first fixing part in a width direction and is suitable for being clamped into the side groove of a profile, and the first fixing part is provided with at least one first convex strip on its bottom surface, the first fixing part is also provided with a second convex strip on its bottom surface, the second convex strip is adjacent to the first combining part, and when the first mounting block is installed on a photovoltaic bracket, the first convex strip and the second convex strip are configured to be attached to the photovoltaic bracket, and there is a gap allowing the second mounting block to enter between the bottom surface of the first fixing part and the photovoltaic bracket, the first fixing part further includes a fastening hole, and a fastener is adapted to pass through the fastening hole to fix the first mounting block on the photovoltaic bracket;

the second mounting block includes a second combining part and a second fixing part, wherein the second combining part extends upward from one end of the second fixing part in the width direction and is suitable for being clamped into the side groove of another profile, and the second fixing part has at least one hook at the other end in the width direction, and when the first mounting block and the second mounting block are combined in the width direction, the at least one hook is adapted to hook the at least one first convex strip to limit the relative movement of the first fixing part and the second fixing part in the width direction.

2. The profile pressing component according to claim 1, wherein both the first combining part and the second combining part each have a first protrusion and a second protrusion, and when the first combining part and the second combining part connect to their respective side groove, each first protrusion is adapted to snap into the top of the respective side groove, and each second protrusion is adapted to snap into the bottom of the respective side groove.

3. The profile pressing component according to claim 2, wherein the first combining part includes a first side plate, a first bottom plate and a first reinforcing plate, the first side plate extending upward from one end of the first bottom plate, the first reinforcing plate being connected between an upper end of the first side plate and the other end of the first bottom plate; and wherein the first protrusion is located at the upper end of the first side plate, and the second protrusion is located at a lower end of the first side plate.

4. The profile pressing component according to claim 2, wherein a first groove is provided between the second protrusion and the second convex strip, and the first groove is adapted to engage with a lower notch of the side groove.

5. The profile pressing component according to claim 3, wherein the first side plate further includes a limiting fastening hole, a limiting fastener is adapted to pass through the limiting fastening hole to fix the first combining part and the profile; and/or the first side plate further includes a limiting protrusion, a limiting groove is correspondingly provided in the side groove, and the limiting protrusion is suitable for being snapped into the limiting groove.

6. The profile pressing component according to claim 2, wherein the second combining part includes a second side plate, a second bottom plate and a second reinforcement plate, the second side plate extending upward from one end of the second bottom plate, and the second reinforcement plate being connected between an upper end of the second side plate and the other end of the second bottom plate; and wherein the first protrusion is located at the upper end of the second side plate, and the second protrusion is located at a lower end of the second side plate.

7. The profile pressing component according to claim 6, wherein a second groove is provided between the second protrusion and the second bottom plate, and the second groove is adapted to engage with a lower notch of the side groove.

8. The profile pressing component according to claim 6, wherein the second side plate further includes a limiting protrusion, a limiting groove is correspondingly provided in the side groove, and the limiting protrusion is adapted to snap into the limiting groove; and/or the second side plate further includes a limiting fastening hole, and a limiting fastener is adapted to pass through the limiting fastening hole to fix the second combining part and the another profile.

9. The profile pressing component according to claim 1, wherein when a plurality of first protrusions are provided on the bottom surface of the first fixing part, there is a plug-in interval between two adjacent first protrusions, and the plug-in interval is larger than a length of a hook portion of the hook.

10. A method for installing a profile pressing component including a first mounting block and a second mounting block, wherein the first mounting block includes a first combining part and a first fixing part, the first combining part extending upward from one end of the first fixing part in a width direction, the first fixing part being provided with at least one first convex strip on its bottom surface, the first fixing part is also provided with a second convex strip on its bottom surface, the second convex strip is adjacent to the first combining part, and when the first mounting block is installed on a photovoltaic bracket, the first convex strip and the second convex strip are configured to be attached to the photovoltaic bracket, and there is a gap allowing the second mounting block to enter between the bottom surface of the first fixing part and the photovoltaic bracket, the first fixing part further includes a fastening hole, and a fastener is adapted to pass through the fastening hole to fix the first mounting block on the photovoltaic bracket, and the second mounting block includes a second combining part and a second fixing part, the second combining part extending upward from one end of the second fixing part in the width direction, the second fixing part having at least one hook at the other end in the width direction; wherein the method includes the following steps:

installing the first mounting block on one profile, and installing the second mounting block on another profile;

fixing the first mounting block on the photovoltaic bracket through the fastener, placing the second mounting block on the photovoltaic bracket so that the second fixing part is opposite to the first fixing part, and the hook and the first convex strip are stagger in a length direction of the profiles;

translating the second mounting block along the width direction so that the hook passes over the first convex strip; and moving the second mounting block along the length direction of the profiles, so that the hook hooks the first convex strip, and the hook is located between the first mounting block and the photovoltaic bracket.

\* \* \* \* \*